(12) United States Patent
Stachowiak

(10) Patent No.: US 6,586,102 B1
(45) Date of Patent: Jul. 1, 2003

(54) COATED ARTICLE WITH ANTI-REFLECTIVE LAYER(S) SYSTEM

(75) Inventor: Grzegorz Stachowiak, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/997,245

(22) Filed: Nov. 30, 2001

(51) Int. Cl.⁷ .............................................. B32B 17/06
(52) U.S. Cl. ...................... 428/432; 428/426; 428/428; 428/446; 428/448; 428/450; 428/457; 428/469; 428/472; 428/621; 428/622; 428/623; 428/627; 428/632; 428/660; 428/666; 428/673; 428/680; 428/688; 428/689; 428/697; 428/698; 428/699; 428/701; 428/702; 428/704
(58) Field of Search .................................. 428/448, 472, 428/432, 673, 697, 698, 699, 701, 702, 704, 621, 622, 623, 627, 632, 660, 666, 680, 426, 428, 446, 450, 457, 469, 688, 689

(56) References Cited

U.S. PATENT DOCUMENTS

| | | | |
|---|---|---|---|
| 4,716,086 A | 12/1987 | Gillery et al. | |
| 4,965,121 A | 10/1990 | Young et al. | |
| 5,229,194 A | 7/1993 | Lingle et al. | |
| 5,338,422 A | 8/1994 | Belkind et al. | |
| 5,342,675 A | 8/1994 | Kobayashi et al. | |
| 5,344,718 A | 9/1994 | Hartig et al. | |
| 5,376,455 A | 12/1994 | Hartig et al. | |
| 5,377,045 A | 12/1994 | Wolfe et al. | |
| 5,514,476 A | 5/1996 | Hartig et al. | |
| 5,521,765 A | 5/1996 | Wolfe | |
| 5,557,462 A | 9/1996 | Hartig et al. | |
| 5,563,734 A | 10/1996 | Wolfe et al. | |
| 5,688,585 A | 11/1997 | Lingle et al. | |
| 5,770,321 A | 6/1998 | Hartig et al. | |
| 5,800,933 A | 9/1998 | Hartig et al. | |
| 5,948,131 A | 9/1999 | Neuman | |
| 6,014,872 A | 1/2000 | Hartig et al. | |
| 6,059,909 A | 5/2000 | Hartig et al. | |
| 6,132,881 A | 10/2000 | Hartig et al. | |
| 6,159,607 A | 12/2000 | Hartig et al. | |
| 6,210,784 B1 * | 4/2001 | Rondeau et al. | 359/580 |
| 6,238,781 B1 | 5/2001 | Anderson et al. | |
| 6,306,525 B1 | 10/2001 | Schicht et al. | |
| 6,340,529 B1 * | 1/2002 | Ebisawa et al. | 359/359 |
| 6,445,503 B1 | 9/2002 | Lingle | |
| 6,475,626 B1 | 11/2002 | Stachowiak | |
| 6,495,251 B1 | 12/2002 | Arbab et al. | |
| 6,495,263 B2 | 12/2002 | Stachowiak | |
| 2001/0041252 A1 | 11/2001 | Laird | |
| 2002/0031674 A1 | 3/2002 | Laird | |

OTHER PUBLICATIONS

"Optical Interference Coatings", Technical Digest, Jun. 1995, Wolfe et al., pp. 115–117.

U.S. patent application Ser. No. 09/95,800, filed Nov. 29, 2001 (copy attached hereto).

* cited by examiner

*Primary Examiner*—Deborah Jones
*Assistant Examiner*—Andrew T Piziali
(74) *Attorney, Agent, or Firm*—Nixon & Vanderhye P.C.

(57) ABSTRACT

Coated articles are provided with an anti-reflective (AR) layer(s) system which enables reduced reflection, increased visible transmission, and/or neutral color. In certain embodiments, the AR layer(s) system includes a silicon nitride layer(s), a silicon oxynitride layer, and/or a silicon oxide layer on the substrate over an infrared (IR) reflecting layer(s) such as silver. The AR system surprisingly enables improved visible transmission and/or reflection to be combined with more neutral color.

17 Claims, 5 Drawing Sheets

COATED ARTICLE WITH ANTI-REFLECTIVE LAYER(S) SYSTEM

RELATED APPLICATION

This application is related to commonly owned U.S. patent application Ser. No. 09/995,800, filed Nov. 29, 2001, which is hereby incorporated herein by reference.

This application relates to a coated article including an anti-reflective layer(s) system. The anti-reflective layer(s) system may include one or more layers.

BACKGROUND AND SUMMARY OF THE INVENTION

Coated articles are known in the art. For example, U.S. Pat. No. 5,800,933 discloses a coated article with a solar controlling layer system. The '933 coated article includes: substrate/$TiO_2$/$Si_3N_4$/NiCr/Ag/NiCr/$Si_3N_4$. In such coatings, the NiCr (nickel-chrome or nichrome) contact layers function to protect the Ag (silver) layer and also serve as adhesion and/or nucleation layers. The dielectric layers (i.e., $TiO_2$, $Si_3N_4$) serve protective functions and also perform anti-reflection functions (i.e., they reduce visible reflectance), and as a result serve to increase transmission of the overall coated article.

Unfortunately, the coating of the '933 Patent utilizes $TiO_2$ as an underlayer. $TiO_2$ often tends to be optically unstable with heat treatment (e.g., thermal tempering or heat bending of coated glass article). For example, $TiO_2$ may change visibly upon heat treatment so that coated articles with the same coating thereon tend to look much different after heat treatment than their non-heat treated counterparts. This is not desirable when heat treated and non-heat treated coated articles have to be used side-by-side (e.g., in commercial buildings).

Figure 1:
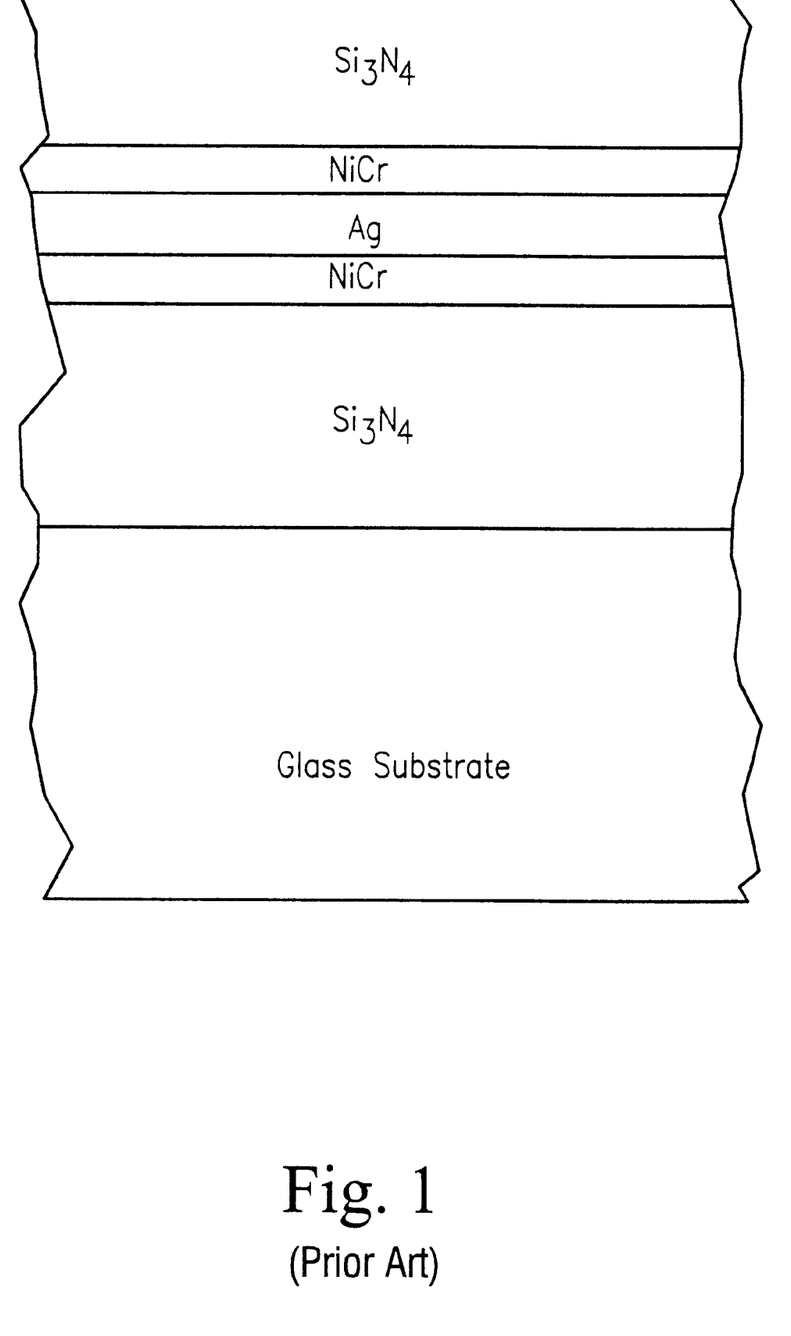
FIG. 1 is a cross sectional view of a prior art coated article.

FIG. 1 is a cross sectional view of another prior art coated article. The FIG. 1 coated article includes: substrate/$Si_3N_4$/NiCr/Ag/NiCr/$Si_3N_4$. While coated articles such as that shown in FIG. 1 provide good ultraviolet (UV) and/or infrared (IR) reflection, they do face problems. Such problems often relate to meeting high visible transmission requirements imposed by industry standards and/or markets, while simultaneously satisfying UV and/or IR needs. The need for higher visible transmission often forces coating designers to minimize contact layer thicknesses and/or change contact layer materials to less absorbing and/or less durable options. The unfortunate consequence of this may be marginal durability of the coated article if high transmission requirements are to be met. In other words, it would be desirable if visible transmission of such articles could be increased and/or if visible reflection of such articles (glass side and/or film side) could be reduced while maintaining good durability.

Neutral color is also desirable for coated articles in many applications. Unfortunately, many conventional methods of making color of a coated article more neutral result in decreased visible transmission and/or increased visible reflection. Heretofore, it has been difficult to increase visible transmission and reduce visible reflection, while at the same time providing more neutral color and maintaining satisfactory solar control or thermal characteristics. Whether a color is "neutral" or not is subjective, and is a function of personal taste. However, generally speaking, color moving toward a neutral color target (e.g., $a^*=0$, $b^*=0$, or some other neutral color target such as transmissive $a^*=-2$ and transmissive $b^*=-3.4$) is desired.

In view of the above, it is an object of certain embodiments of this invention to provide a solar controlling coated article (i.e., an article including at least one layer for reflecting IR and/or UV) having increased visible transmission and/or reduced visible reflectance. In certain embodiments of this invention, it is an object to combine such high visible transmission and/or reduced visible reflectance with neutral color of the coated article. One or more of these objects is/are achieved by providing such coated articles with improved anti-reflection layer(s) system(s). Alternatively, the use of such improved anti-reflection layer(s) system(s) may enable coatings to have or utilize more robust contact layer(s) (e.g., thicker for better durability) and/or thicker silver (Ag) layer(s) (i.e., improved thermal performance) while maintaining similar transmission characteristics if increased transmission is not a most desired feature (e.g., if durability is a most desired feature).

Another object of this invention is to fulfill one or more of the above-listed objects and/or needs.

In certain example non-limiting embodiments of this invention, one or more of the above-listed objects and/or needs is/are satisfied by providing a coated article including a coating supported by a glass substrate, the coating comprising: a metallic infrared (IR) reflecting layer comprising silver sandwiched between first and second contact layers each of which contacts the IR reflecting layer; a first dielectric layer comprising silicon nitride provided between the IR reflecting layer and the glass substrate; a second dielectric layer comprising silicon oxynitride provided over the IR reflecting layer; a third dielectric layer comprising silicon oxide provided over the IR reflecting layer; and wherein the second dielectric layer comprising silicon oxynitride is provided between the IR reflecting layer and the third dielectric layer comprising silicon oxide.

In certain other example embodiments of this invention, one or more of the above-listed objects and/or needs is/are fulfilled by providing a coated article including a coating supported by a glass substrate, the coating comprising: a metallic infrared (IR) reflecting layer sandwiched between first and second contact layers; a first dielectric layer having an index of refraction $n<=3.0$ provided between the IR reflecting layer and the glass substrate; a second dielectric layer comprising silicon nitride provided over the IR reflecting layer; a third dielectric layer comprising silicon oxynitride provided over the IR reflecting layer; and wherein the second dielectric layer comprising silicon nitride is provided between the IR reflecting layer and the third dielectric layer.

In certain other example embodiments of this invention, one or more of the above listed needs and/or objects is/are fulfilled by providing a coated article comprising a substrate, and a coating provided on the substrate, the coating comprising from the substrate outwardly: a dielectric layer; a layer comprising NiCr; a metallic IR reflecting layer comprising Ag; a layer comprising NiCr; and a layer comprising silicon oxynitride. The silicon oxynitride may or may not be oxidation/nitrogen graded in different embodiments of this invention.

Silicon oxynitride need not be provided in all embodiments herein, as exemplified by the embodiment where the overcoat portion of the AR system includes a silicon nitride layer and a silicon oxide layer.

DETAILED DESCRIPTION OF EXAMPLE EMBODIMENTS OF THE INVENTION

The instant invention relates to coated articles which may be used in applications including but not limited to vehicle windows, architectural windows (e.g., IG units and/or monolithic windows), skylight windows, and/or the like. Coated articles according to this invention include an improved anti-reflection layer(s) system for reducing visible reflectance and/or increasing visible transmission in coated articles that provide solar control (e.g., IR and/or UV reflection) functionality. Surprisingly, in certain example embodiments it has been found that certain anti-reflection layer(s) systems of the instant invention can both: (a) improve visible transmission and/or reduce visible reflectance, while at the same time (b) achieving a neutral, or more neutral, color of the resulting coated article. Coated articles according to different embodiments of this invention may or may not be heat treated in different applications of the invention.

Figure 2:
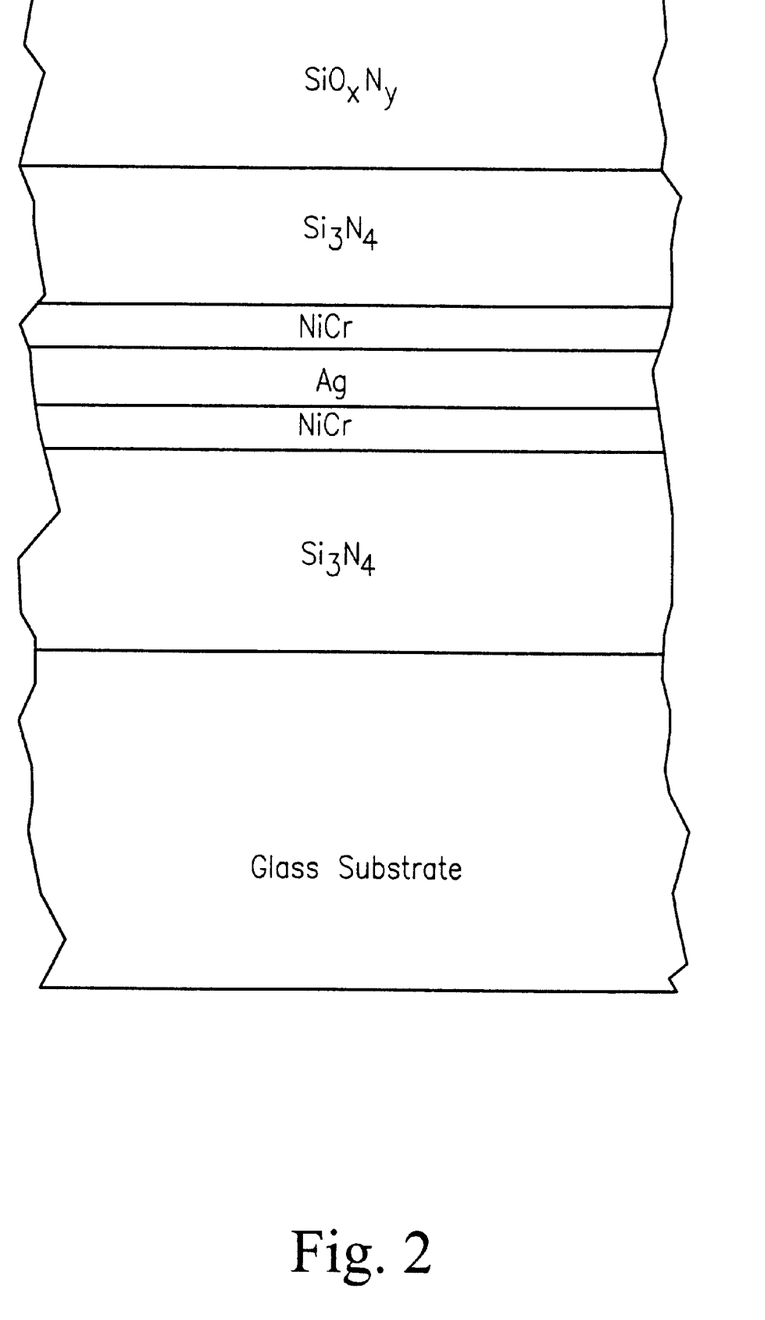
FIG. 2 is a cross sectional view of a coated article according to an embodiment of this invention.

FIG. 2 is a cross sectional view of a coated article according to an embodiment of this invention. The coated article of FIG. 2 includes a coating including, from the glass substrate outwardly (all indices n at 550 nm):

glass (n=1.51)

silicon nitride (e.g., $Si_3N_4$) (n=1.8 to 2.2, preferably n=2.0)

nickel-chromium (NiCr)

silver (Ag)

nickel-chromium (NiCr)

silicon nitride (e.g., $Si_3N_4$) (n=1.8 to 2.2, preferably n=2.0)

silicon oxynitride ($SiO_xN_y$) (n=1.45 to 2.0, preferably n=1.6–1.9)

air (n=1.0)

As shown in FIG. 2, the contact layers (i.e., NiCr layers) surround and contact the IR reflecting Ag layer. The NiCr layers herein are called "contact" layers because they contact the IR reflecting layer (i.e., the Ag layer). The NiCr contact layers provide the most immediate chemical protection for the Ag layer, and also serve as adhesion and/or nucleation layers. Instead of Ag, other IR reflecting materials (e.g., Au) may be used for the IR reflecting layer(s) (this applies to all embodiments herein). The thickness of the metallic Ag layer (IR reflecting layer) is chosen in order to achieve the desired thermal performance. For example, the Ag layer may be from about 30–200 Å thick, more preferably from about 50–160 Å thick, in order to achieve sheet resistance ($R_s$) of less than 25 ohms/square, more preferably less than 20 ohms/square, and most preferably from 2–15 ohms/square.

While NiCr is illustrated as the material used for the contact layers, other materials may instead be used for the contact layers in alternative embodiments of this invention. Such other contact layer materials include, but are not limited to, $NiCrO_x$, $NiCrN_x$, $NiCrO_xN_y$, Ni, Cr, $CrN_x$, $NiO_x$, $NbO_x$, ZnO, $Al_2O_3$, $TiO_2$, $ZnAlO_x$, any combination(s) thereof, or any other suitable material(s) (this applies to all embodiments herein). With respect to all embodiments herein, each contact layer (e.g., each NiCr layer in FIG. 2) may be from about 3–30 Å thick, more preferably from about 5–20 Å thick, and most preferably from about 7–15 Å thick. The contact layer(s) may or may not be continuous in different embodiments of this invention. In alternative embodiments of this invention, the bottom contact layer is optional and need not be provided.

The lower (or undercoat) silicon nitride layer provides anti-reflection and/or color modification functions. This silicon nitride layer may be fully stoichiometric (i.e., $Si_3N_4$) in certain embodiments of this invention, or alternatively may be non-stoichiometric (e.g., Si-rich) in other embodiments of this invention. Optionally, the undercoat silicon nitride layer may be replaced by, or supplemented by, other layer(s) including but not limited to zinc oxide, tin oxide, silicon zirconium nitride, silicon oxide, tantalum oxide, titanium oxide, and/or the like. Again, this applies to all embodiments herein.

In general, the FIG. 2 anti-reflection system includes the bottom silicon nitride layer and the dielectrics provided on top of the NiCr and Ag layers, namely the top silicon nitride and silicon oxynitride layers. As with the bottom silicon nitride layer, the top silicon nitride layer may be fully stoichiometric (i.e., $Si_3N_4$) in certain embodiments of this invention, or alternatively may be non-stoichiometric (e.g., Si-rich) in other embodiments of this invention. By gradually decreasing the respective indices of refraction "n" from the outermost surface of the top NiCr layer (i.e., top contact layer) outwardly toward the air, the anti-reflection system of FIG. 2 enables reduced visible reflection and thus increased visible transmission to be achieved. The use of silicon oxynitride is particularly useful as it can be deposited in different manners (i.e., by adjusting oxygen and nitrogen gas flows during the sputtering process) so as to achieve any desired index of refraction n from 1.45 up to 2.0, more preferably an index of refraction n from 1.6 to 1.9, and most preferably an index of refraction n of from 1.65 to 1.85. Surprisingly, as will be shown below in the Examples of this embodiment, the anti-reflection system also enables color of the coated article (i.e., transmissive and/or glass side reflective color) to move more toward neutral (i.e., as compared to the comparative example CE, in the example of this invention the color value(s) a* and/or b* is closer to zero, or closer to some other neutral color target such as transmissive a*=−2 and transmissive b*=−3.4). With respect to reflective color, some in the art consider reflective a*=−1 and b*=−1.5 to be the ultimate neutral target, thus herein both a reflective color target of a*=−1 and b*=−1.5, and a reflective color target of a*=0 and b*=0 are considered to be "neutral" targets. Other neutral targets may be used in other embodiments of this invention. Of course, these targets need not be met in order for neutral color to be achieved; they are simply targets.

The FIG. 2 embodiment is also advantageous in that all dielectric layers above the top NiCr contact layer include silicon (Si), and thus can be sputtered using the same sputtering target material. Thus, targets need not be changed; only gas flows need to be adjusted/changed in order to form the different dielectric overcoat layer(s).

It has also been found in certain embodiments that it is often desirable for the dielectric undercoat (i.e., bottom silicon nitride layer in FIG. 2) to have an index of refraction n greater than that of the overall weighted average index of the overcoat (overcoat refers to all layers above the top NiCr contact layer, i.e., top silicon nitride and silicon oxynitride layers in the FIG. 2 embodiment). As with all embodiments herein, the illustrated layers are preferably deposited/formed via sputtering, although other deposition techniques may certainly be used in alternative embodiments of this invention.

EXAMPLE(S) OF FIG. 2 EMBODIMENT

The Tables below illustrate Example(s) (Ex.) of the FIG. 2 embodiment, compared to a Comparative Example(s) (CE) similar to prior art FIG. 1 of the instant application. Example A (Ex. A) of the FIG. 2 embodiment should be compared to Comparative Example A (CE A), since they both have the same basic solar control layers (i.e., the Ag and NiCr thicknesses and arrangement are the same in both). Likewise, Example B (Ex. B) of the FIG. 2 embodiment should be compared to Comparative Example B (CE B), since they both have the same basic solar control layers (i.e., the Ag and NiCr thicknesses and arrangement are the same in both). For these simulation examples in the Tables below, the following indices of refraction were assumed at 550 nm: for glass, n=1.51; for $Si_3N_4$, n=2.0; for $SiO_xN_y$, n=1.72.

FIRST TABLE: LAYER STRUCTURE (FIG. 2 embodiment)

| Glass | $Si_3N_4$ | NiCr | Ag | NiCr | $Si_3N_4$ | $SiO_xN_y$ | $SiO_2$ |
|---|---|---|---|---|---|---|---|
| Ex. A: 3.7 mm | 376Å | 9Å | 140Å | 9Å | 223Å | 332Å | 0Å |
| CE A: 3.7 mm | 298Å | 9Å | 140Å | 9Å | 437Å | 0Å | 0Å |
| Ex. B: 3.7 mm | 407Å | 9Å | 70Å | 9Å | 52Å | 501Å | 0Å |
| CE B: 3.7 mm | 464Å | 9Å | 70Å | 9Å | 432Å | 0Å | 0Å |

SECOND TABLE: OPTICAL PERFORMANCE (FIG. 2 embodiment)

| | $T_{vis}$ | $a^*_t$ | $b^*_t$ | $R_{glass}$ side (g) | $a^*_g$ | $b^*_g$ | $R_{film}$ side (f) | $a^*_f$ | $b^*f$ |
|---|---|---|---|---|---|---|---|---|---|
| Ex. A: | 68.4% | −4.0 | −0.4 | 12.6% | 4.4 | −2.9 | 8.2% | 11.7 | −4.3 |
| CE A: | 67.5% | −4.3 | −1.1 | 12.6% | 5.8 | −3.4 | 6.7% | 15.8 | −145 |
| Ex. B: | 77.3% | −2.1 | −0.7 | 5.4% | −0.3 | −4.8 | 3.1% | 4.3 | −2.3 |
| CE B: | 76.0% | −2.1 | −0.7 | 5.3% | −0.2 | −7.2 | 3.9% | 2.8 | 2.0 |

It can be seen from the Tables above regarding the FIG. 2 embodiment of this invention, that the anti-reflection system of the instant invention enables not only better visible transmission characteristics (i.e., increased transmission $T_{vis}$ %), but also surprisingly also at the same time provides color values which moved more toward the neutral. In particular, Ex. A had better visible transmission (higher $T_{vis}$) than CE A; Ex. A had the same glass side visible reflection ($R_g$) as CE A; and Ex. A had more neutral $a^*_t$ (transmissive a*) and $a^*_g$ (glass side reflective a*) values, and $b^*_t$ (transmissive b*) and $b^*_g$ (glass side reflective b*) values than CE A. Likewise, Ex. B had better visible transmission than did comparative example CE B, and also had a significantly better glass side reflective b* value than did CE B. Accordingly, it can be seen that while both Examples A and B were advantageous over the Comparative Examples, the advantages were more pronounced in the coated articles having the higher Ag thicknesses (i.e., Ex. A).

Figure 3:
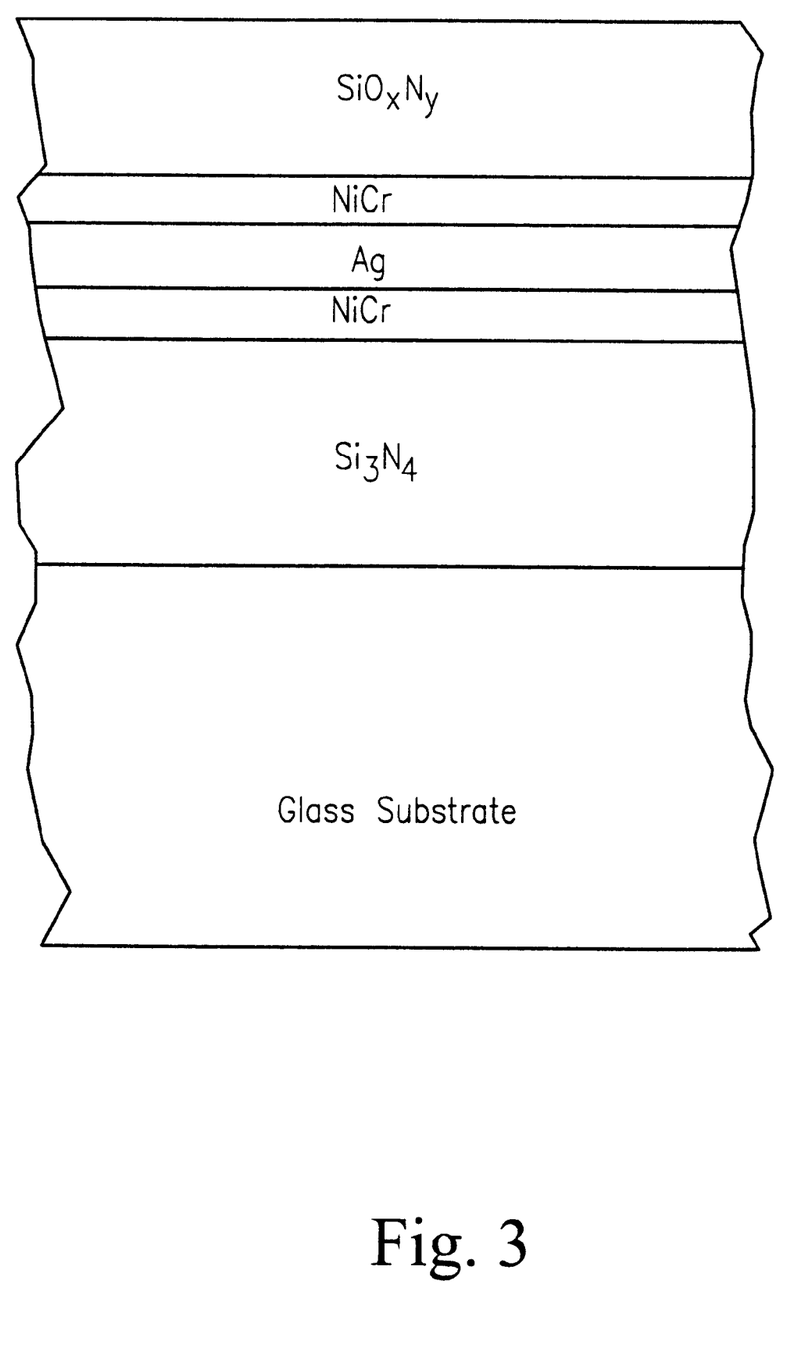
FIG. 3 is a cross sectional view of a coated article according to another embodiment of this invention.

FIG. 3 is a cross sectional view of a coated article according to another embodiment of this invention. The coated article of FIG. 3 includes a coating including, from the glass substrate outwardly (all indices n at 550 nm):

glass (n=1.51)
silicon nitride (e.g., $Si_3N_4$) (n=1.8 to 2.2, preferably n=2.0)
nickel-chromium (NiCr)
silver (Ag)
nickel-chromium (NiCr)
silicon oxynitride ($SiO_xN_y$) (n=1.45 to 2.0, preferably n=1.6–1.9)
air (n=1.0)

The FIG. 3 anti-reflection system includes the bottom silicon nitride layer and the silicon oxynitride layer provided over the metal layers. Surprisingly, the use of silicon oxynitride on the top of the metal layers results in increased visible transmission and reduced glass side visible reflection as compared to using silicon nitride on top of the metal layers. Neutral color is also achievable in certain example non-limiting embodiments. The use of silicon oxynitride is useful in that its index of refraction can be varied from 1.45 to 2.0, more preferably from 1.6 to 1.9, and most preferably from 1.65 to 1.85, in different embodiments of this invention. The silicon oxynitride layer may have a constant (or approximately constant, i.e., constant plus/minus about 5%) index of refraction n throughout its entire thickness in certain embodiments of this invention, but alternatively may be oxidation and/or nitride graded so as to have an index of refraction n which varies through the thickness of the layer (e.g., the index n may gradually decrease through the thickness of the layer going away from the NiCr layer and toward air).

EXAMPLE(S) OF FIG. 3 EMBODIMENT

The Tables below illustrate Example(s) (Ex.) of the FIG. 3 embodiment, compared to a Comparative Example(s) (CE) similar to prior art FIG. 1 of the instant application. Example A (Ex. A) of the FIG. 3 embodiment should be compared to Comparative Example A (CE A), since they both have the same basic solar control layers (i.e., the Ag and NiCr thicknesses and arrangement are the same in both). Likewise, Example B (Ex. B) of the FIG. 3 embodiment should be compared to Comparative Example B (CE B), since they both have the same basic solar control layers (i.e., the Ag and NiCr thicknesses and arrangement are the same in both). The same applies for Example C. For these simulation examples in the Tables below, the following indices of refraction n were assumed (all indices n herein are at 550 nm): for glass, n=1.51; for $Si_3N_4$, n=2.0; for $SiO_xN_y$, n=1.72.

FIRST TABLE: LAYER STRUCTURE (FIG. 3 embodiment)

| Glass | $Si_3N_4$ | NiCr | Ag | NiCr | $Si_3N_4$ | $SiO_xN_y$ | $SiO_2$ |
|---|---|---|---|---|---|---|---|
| Ex. A: 3.7 mm | 380Å | 9Å | 120Å | 9Å | 0Å | 571Å | 0Å |
| CE A: 3.7 mm | 332Å | 9Å | 120Å | 9Å | 570Å | 0Å | 0Å |
| Ex. B: 3.7 mm | 295Å | 9Å | 100Å | 9Å | 0Å | 589Å | 0Å |
| CE B: 3.7 mm | 359Å | 9Å | 100Å | 9Å | 608Å | 0Å | 0Å |
| Ex. C: 3.7 mm | 399Å | 9Å | 70Å | 9Å | 0Å | 550Å | 0Å |
| CE C: 3.7 mm | 464Å | 9Å | 70Å | 9Å | 432Å | 0Å | 0Å |

SECOND TABLE: OPTICAL PERFORMANCE (FIG. 3 embodiment)

| | $T_{vis}$ | $a^*_t$ | $b^*_t$ | $R_{glass}$ side (g) | $a^*_g$ | $b^*_g$ | $R_{film}$ side (f) | $a^*_f$ | $b^*_f$ |
|---|---|---|---|---|---|---|---|---|---|
| Ex. A: | 71.1% | −3.6 | −0.4 | 10.3% | 4.0 | −2.7 | 7.4% | 10.1 | −4.1 |

-continued

SECOND TABLE: OPTICAL PERFORMANCE (FIG. 3 embodiment)

|       | $T_{vis}$ | $a^*_t$ | $b^*_t$ | $R_{glass}$ side (g) | $a^*_g$ | $b^*_g$ | $R_{film}$ side (f) | $a^*_f$ | $b^*_f$ |
|-------|-------|------|------|--------|------|------|-------|------|-------|
| CE A: | 67.3% | -2.2 | 4.0  | 16.9%  | -2.5 | -7.5 | 8.8%  | 2.3  | -20.8 |
| Ex. B:| 72.9% | -2.7 | 0.0  | 10.1%  | 0.7  | -4.4 | 5.2%  | 7.4  | -8.4  |
| CE B: | 68.0% | -1.7 | 4.4  | 16.2%  | -3.7 | -6.5 | 8.8%  | 0.1  | -21.0 |
| Ex. C:| 77.2% | -2.2 | -0.8 | 5.3%   | 0.0  | -4.9 | 3.1%  | 4.7  | -2.1  |
| CE C: | 76.0% | -2.1 | -0.7 | 5.3%   | -0.2 | -7.2 | 3.9%  | 2.8  | 2.0   |

It can be seen from the Tables above regarding the FIG. 3 embodiment of this invention, that the anti-reflection system of the instant invention enables not only better transmission characteristics (i.e., increased transmission %) and better reflection characteristics (i.e., reduced glass side reflection ($R_g$)), but surprisingly also at the same time in Example A of the FIG. 3 embodiment provides certain color values which move significantly more toward the neutral relative to the Comparative Example (CE A). In particular, Ex. A had better visible transmission (higher $T_{vis}$) than CE A; Ex. A had better glass side visible reflection (lower $R_g$) than CE A; and Ex. A had significantly better $b^*_t$ (transmissive $b^*$), $b^*_g$ (glass side reflective $b^*$), and $b^*_f$ (film side visible reflective $b^*$) values closer to neutral as a result of the anti-reflection layer system of the FIG. 3 embodiment. As for Example B, it had better visible transmission (higher $T_{vis}$) than CE B; Ex. B had better glass side visible reflection (lower $R_g$) than CE B; and Ex. B had significantly better $b^*_t$, $b^*_g$, $b^*_f$, and $a^*_g$ values closer to neutral as a result of the anti-reflection layer system of the FIG. 3 embodiment. Example C also had better visible transmission and better film side visible reflection than CE C. It is noted, for example, that in Ex. A the silicon oxynitride layer was characterized by n=1.721 and k=0.016 at 550 nm, while the silicon nitride overcoat in CE A was characterized by n=1.957 and k=0.013 at 550 nm (same in other examples herein). As previously mentioned, the indices n and k of the silicon oxynitride can be tuned to any desired value within the aforesaid range, either with or without grading. For example and without limitation, exemplar optimum indices n for the silicon oxynitride changes depending upon the thickness of the Ag layer (e.g., the index n of the silicon oxynitride may be from 1.6 to 1.7 for thin Ag layers, and up to about 2.0 when the Ag layer thickness is increased to about 120 Å or so. Also, the optimum n may be higher than 2.0 when the Ag layer is more than 120 Å thick.

Figure 4:
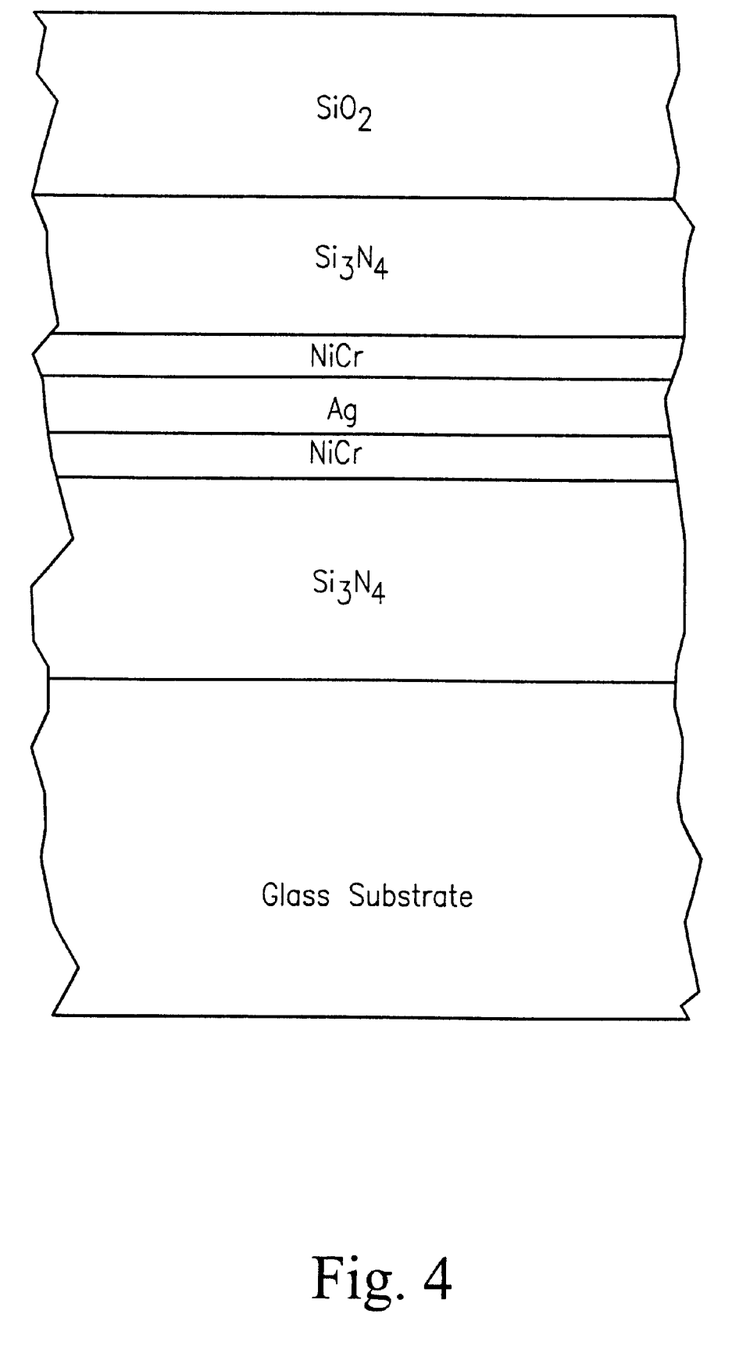
FIG. 4 is a cross sectional view of a coated article according to another embodiment of this invention.

FIG. 4 is a cross sectional view of a coated article according to another embodiment of this invention. The coated article of FIG. 4 includes a coating including, from the glass substrate outwardly (indices n at 550 nm):

glass (n=1.51).

silicon nitride (e.g., $Si_3N_4$) (n=1.8 to 2.2, preferably n=2.0)

nickel-chromium (NiCr)

silver (Ag)

nickel-chromium (NiCr)

silicon nitride (e.g., $Si_3N_4$) (n=1.8 to 2.2, preferably n=2.0)

silicon oxide (e.g., $SiO_2$) (n=1.4 to 1.7, preferably n=1.45)

air (n=1.0)

The FIG. 4 anti-reflection system includes the bottom silicon nitride layer and the dielectrics provided on top of the NiCr and Ag layers, namely the top silicon nitride (e.g., $Si_3N_4$, or any other suitable non-stoichiometric form of silicon nitride depending upon the index n desired) layer and the silicon oxide layer. By progressively (gradually) decreasing the respective indices of refraction "n" from the top NiCr layer (i.e., top contact layer) outwardly toward the air, the anti-reflection system enables reduced visible reflection and increased visible transmission to be achieved. The index of silicon oxynitride is variable as discussed above. Thus, the index n of the silicon oxide is less than that of the silicon nitride. Surprisingly, as will be shown below in the Example(s) of this embodiment, the anti-reflection system also enables color of the coated article (i.e., transmissive and/or glass side reflective) to move more toward neutral.

EXAMPLE(S) OF FIG. 4 EMBODIMENT

The Tables below illustrate Example(s) (Ex.) of the FIG. 4 embodiment, compared to a Comparative Example(s) (CE) similar to prior art FIG. 1 of the instant application. Example A (Ex. A) of the FIG. 4 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed (all at 550 nm): for glass, n=1.51; for $Si_3N_4$, n=2.0; for $SiO_2$, n=1.45.

FIRST TABLE: LAYER STRUCTURE (FIG. 4 embodiment)

| Glass        | $Si_3N_4$ | NiCr | Ag    | NiCr | $Si_3N_4$ | $SiO_xN_y$ | $SiO_2$ |
|--------------|-----------|------|-------|------|-----------|------------|---------|
| Ex. A: 3.7 mm| 342Å      | 9Å   | 100Å  | 9Å   | 269Å      | 0Å         | 437Å    |
| CE A: 3.7 mm | 359Å      | 9Å   | 100Å  | 9Å   | 608Å      | 0Å         | 0Å      |

SECOND TABLE: OPTICAL PERFORMANCE (FIG. 4 embodiment)

|       | $T_{vis}$ | $a^*_t$ | $b^*_t$ | $R_{glass}$ side (g) | $a^*_g$ | $b^*_g$ | $R_{film}$ side (f) | $a^*_f$ | $b^*_f$ |
|-------|-------|------|------|-------|------|------|------|------|-------|
| Ex. A:| 73.6% | -2.5 | -0.8 | 8.3%  | 0.8  | -1.9 | 4.1% | 6.9  | -3.1  |
| CE A: | 68.8% | -1.7 | 4.4  | 16.2% | -3.7 | -6.5 | 8.8% | -0.1 | -21.0 |

It can be seen from the Tables above regarding the FIG. 4 embodiment of this invention, that the anti-reflection system of the instant invention enables not only better transmission characteristics (i.e., increased visible transmission %) and better reflection characteristics (i.e., reduced glass side visible reflection ($R_g$) and film side reflection ($R_f$)), but surprisingly also at the same time in Example A of the FIG. 4 embodiment provides color values which mostly moved more toward the neutral relative to the Comparative Example (CE). In particular, Ex. A had better visible transmission (higher $T_{vis}$) than CE A; Ex. A had better glass side and film side visible reflection than CE A; and Ex. A had $b^*_t$ (transmissive $b^*$), $a^*_g$ (glass side reflective $a^*$), $b^*_g$ (glass side reflective $b^*$), and $b^*_f$ (film side reflective $b^*$) color values closer to neutral as a result of the anti-reflection layer system of the FIG. 4 embodiment. While the film side reflective $a^*$ value of Example A was slightly worse than in CE A, these are greatly outweighed by the significant improvements in the other a* and b* values moving toward neutral as can be seen above.

Figure 5:
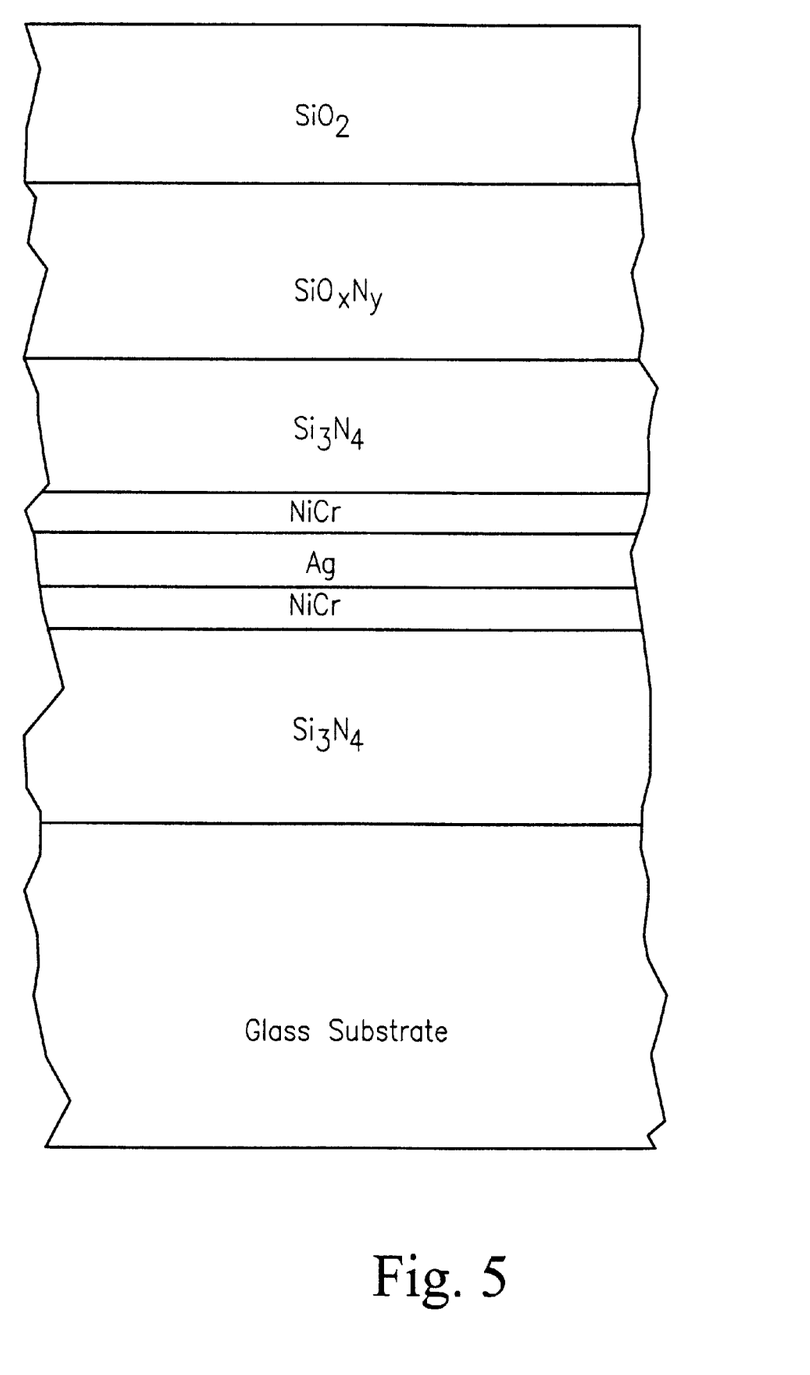
FIG. 5 is a cross sectional view of a coated article according to another embodiment of this invention.

FIG. 5 is a cross sectional view of a coated article according to another embodiment of this invention. The coated article of FIG. 5 includes a coating including, from the glass substrate outwardly (all indices at 550 nm):

glass (n=1.51)

silicon nitride (e.g., $Si_3N_4$) (n=1.8 to 2.2, preferably n=2.0)

nickel-chromium (NiCr)

silver (Ag)

nickel-chromium (NiCr)

silicon nitride (e.g., $Si_3N_4$) (n=1.8 to 2.2, preferably n=2.0)

silicon oxynitride ($SiO_xN_y$)(n=1.45 to 2.0, preferably n=1.6–1.9)

silicon oxide (e.g., $SiO_2$) (n=1.4 to 1.7, preferably n=1.45)

air (n=1.0)

The FIG. 5 anti-reflection system includes the bottom silicon nitride layer and the dielectrics provided on top of the NiCr and Ag layers, namely the top silicon nitride layer, the silicon oxynitride layer, and the silicon oxide layer. By gradually decreasing the respective indices of refraction "n" from the top NiCr layer (i.e., top contact layer) outwardly toward the air, the anti-reflection system enables reduced visible reflection and thus increased visible transmission to be achieved. Surprisingly, as will be shown below in the Example(s) of this embodiment, the anti-reflection system also enables color of the coated article (i.e., transmissive and/or glass side reflective) to have more neutral b* color values. This embodiment is also advantageous in that since all three top dielectric layer include Si, they can all be sputtered from the same type of target(s) (i.e., Si sputtering target(s)).

EXAMPLE(S) OF FIG. 5 EMBODIMENT

The Tables below illustrate Example(s) (Ex.) of the FIG. 5 embodiment, compared to a Comparative Example(s) (CE) similar to prior art FIG. 1 of the instant application. Example A (Ex. A) of the FIG. 5 embodiment should be compared to Comparative Example A (CE A), since they both have the same basic solar control layers (i.e., the Ag and NiCr thicknesses and arrangement are the same in both). For these simulation examples in the Tables below, the following indices of refraction were assumed at 550 nm: for glass, n=1.51; for $Si_3N_4$, n=2.0; for $SiO_xN_y$, n=1.72; for $SiO_2$, n=1.45.

FIRST TABLE: LAYER STRUCTURE (FIG. 5 embodiment)

| Glass | $Si_3N_4$ | NiCr | Ag | NiCr | $Si_3N_4$ | $SiO_xN_y$ | $SiO_2$ |
|---|---|---|---|---|---|---|---|
| Ex. A: 3.7 mm | 383Å | 9Å | 120Å | 9Å | 226Å | 157Å | 286Å |
| CE A: 3.7 mm | 332Å | 9Å | 120Å | 9Å | 570Å | 0Å | 0Å |

SECOND TABLE: OPTICAL PERFORMANCE (FIG. 5 embodiment)

| | $T_{vis}$ | $a^*_t$ | $b^*_t$ | $R_{glass}$ side (g) | $a^*_g$ | $b^*_g$ | $R_{film}$ side (f) | $a^*_f$ | $b^*_f$ |
|---|---|---|---|---|---|---|---|---|---|
| Ex. A: | 71.6% | −3.2 | −0.6 | 9.7% | 3.1 | −2.5 | 6.0% | 9.6 | −3.5 |
| CE A: | 67.3% | −2.2 | 4.0 | 16.9% | −2.5 | −7.5 | 8.8% | 2.3 | −20.8 |

It can be seen from the Tables above regarding the FIG. 5 embodiment of this invention, that the anti-reflection system of the instant invention enables not only better transmission characteristics (i.e., increased transmission %), better (i.e., reduced) glass side visible reflection, and better (i.e., reduced) film side visible reflection, but surprisingly also at the same time Example A of the FIG. 5 embodiment provides significantly more neutral b* color values than CE A.

In all embodiments herein, silicon oxynitride layer(s) may have a constant index of refraction n through its entire (or most of its) thickness (e.g., n=1.72). However, it also may be oxidation and/or nitrogen graded throughout its thickness so that its index of refraction "n" (and optionally k) progressively or gradually changes (e.g., decreases) throughout its thickness from one side to the other. For example, by adjusting the oxygen and/or nitrogen gas flow/amount used in depositing the silicon oxynitride layer during its sputtering, its index of refraction n may change from about 1.8 at the portion of the silicon oxynitride layer closest to the Ag layer to a lesser value of about 1.6 at the portion of the layer closer to air. By grading the silicon oxynitride layer in such a manner, the index of refraction can progressively decrease moving toward air in order to increase visible transmission and/or reduce reflection of the overall coated article. It is also possible for the silicon oxynitride layer to be oxidation and/or nitrogen graded so that it transitions seamlessly into for example an upper silicon oxide layer and/or a lower silicon nitride layer, in which case the index n in the silicon nitride layer may vary from about 1.45 to 2.0 in the same layer if both oxidation and nitrogen grading are used (i.e., adjacent the silicon oxide layer the nitrogen flow may be at or close to zero, and/or adjacent the silicon nitride layer the oxygen flow may be at or close to zero).

With respect to neutrality of color, in certain example embodiments of this invention coated articles have: (a) transmissive a* values from −6.0 to +3.0, more preferably from −4.0 to +2.0, even more preferably from −2.5 to +1.0; and most preferably from −2.5 to +0.5; (b) transmissive b* values from −6.0 to +3.0, more preferably −4.0 to +2.0, even more preferably from −2.5 to +2.0, and most preferably from −2.0 to +0.5; (c) glass side reflective a* values from −5.0 to +5.0, more preferably from −4.0 to +4.0, even more preferably from −2.5 to +3.0, and most preferably from −2.5 to +2.5; (d) glass side reflective b* values from −7.0 to +4.0, more preferably −5.0 to +2.5, even more preferably from −3.0 to +2.0; (e) film side reflective a* values from −11.0 to +12.0, more preferably from −8.0 to +10.0, and most preferably from −5.0 to +8.0; and/or (f) film side reflective b* values from −11.0 to +11.0, more preferably from −9.0 to +5.0, and most preferably from −7.0 to +4.0. As for visible transmission ($T_{vis}$), coated articles according to certain example embodiments of this invention have a visible transmission ($T_{vis}$) (Ill. C, 2 degree observer) of at least 70%, more preferably of at least 74%, and most preferably of at least 77% (e.g., at a glass substrate thickness of 1–4 mm). Coated articles according to certain example embodiments of this invention have a glass side reflectance ($R_g$) <=15%, more preferably <=10%, even more preferably <=8%, and most preferably <=6% (it is noted that glass side reflectance in this regard is a function of thickness of the Ag layer; the thicker the Ag layer the higher the glass side reflectance but also the better the thermal properties of the coated article— so there are tradeoffs in different embodiments of this invention). The aforesaid characteristics apply to heat treated and/or non-heat treated coated articles according to this invention.

While the illustrated embodiments discussed above each include only a single IR reflecting layer (e.g., Ag), it is noted that in alternative embodiments of this invention additional IR reflecting layer(s) (e.g., Ag) may be provided. Thus, AR systems herein may be applied over a single Ag layer stack as illustrated in FIGS. 2–5, or alternatively may be provided over double or even triple Ag layer stacks as will be recognized by those skilled in the art. Moreover, additional layer(s) may be added to coated articles according to this invention, either between the illustrated coatings and the substrate, over the illustrated coatings and the substrate, and/or between layers of the illustrated coatings. Thus, referring to FIG. 2 for purposes of example, while the silicon oxynitride layer is located over the upper silicon nitride layer, other additional layer(s) may in some instances also be provided between the silicon oxynitride and silicon nitride layers (i.e., the term "between" as used herein does not mean that a first layer located "between" two other layers has to contact those other layers).

Thicknesses of the contact (e.g., NiCr) layers and the IR reflecting layer(s) (e.g.,. Ag) are discussed above. With respect to other layer thicknesses, bottom silicon nitride layers according to example embodiments of this invention may be from 10–600 Å thick, more preferably from 50–300 Å thick, and most preferably from 50–250 Å thick. Top silicon nitride layers in certain example embodiments of this invention may be from 10–600 Å thick, more preferably from 50–500 Å thick, and most preferably from 50–400 Å thick. Silicon oxynitride layers according to certain example embodiments of this invention may be from 20–800 Å thick, more preferably from 40–600 Å thick. Silicon oxide layers according to example embodiments of this invention may be from about 10–700 Å thick, more preferably from 20–600 Å thick, and most preferably from 50–500 Å thick. Moreover, while these materials are used in certain examples of this invention, they are not to be limiting unless specifically claimed as other layer material(s) may instead be used in the general nature of the instant invention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A coated article including a coating supported by a glass substrate, the coating comprising:
   an infrared (IR) reflecting layer comprising silver sandwiched between first and second contact layers;
   a first dielectric layer having an index of refraction n<=3.0 provided between the IR reflecting layer and the glass substrate;
   a second dielectric layer comprising silicon nitride provided over the IR reflecting layer;
   a third dielectric layer comprising silicon oxynitride provided over the IR reflecting layer;
   wherein the second dielectric layer comprising silicon nitride is provided between the IR reflecting layer and the third dielectric layer; and
   a fourth dielectric layer comprising silicon oxide provided over the second and third dielectric layers.

2. The coated article of claim 1, wherein the third dielectric layer comprising silicon oxynitride contacts the second dielectric layer comprising silicon nitride.

3. The coated article of claim 1, wherein the coated article has a visible transmission of at least 70%, a sheet resistance ($R_s$) of no greater than 20 ohms/square, and a glass side reflectance <=15%.

4. The coated article of claim 1, wherein the coated article has a visible transmission of at least 74%.

5. The coated article of claim 1, wherein the first dielectric layer comprises silicon nitride.

6. The coated article of claim 1, wherein the silicon nitride of at least one of the first and second dielectric layers comprises $Si_3N_4$.

7. The coated article of claim 1, wherein the IR reflecting layer comprises Ag, and wherein at least one of the first and second contact layers comprises NiCr.

8. The coated article of claim 1, wherein at least one of the first and second contact layers comprises an oxide of NiCr.

9. The coated article of claim 1, wherein at least one of the first and second contact layers comprises a nitride of NiCr.

10. The coated article of claim 1, wherein the coated article has color characterized by: a transmissive a* value from –6.0 to +3.0, a transmissive b* value from –6.0 to +3.0, a glass side reflective b* value from –7.0 to +4.0, and a film side reflective b* value from –11.0 to +11.0.

11. The coated article of claim 10, wherein the coated article has color characterized by at least one of a transmissive a* value from –2.5 to +1.0, a glass side reflective b* value from –3.0 to +2.0, and a film side reflective b* value of from –7.0 to +4.0.

12. The coated article of claim 1, wherein the third dielectric layer comprising silicon oxynitride is tuned so as to have an index of refraction n from 1.6 to 1.9.

13. The coated article of claim 1, wherein the third dielectric layer comprising silicon oxynitride is at least one of oxidation graded and nitrogen graded, so that an index of refraction n of the third dielectric layer comprising silicon oxynitride changes from a first value in a first portion of the third dielectric layer to a smaller second value in a second portion of the third dielectric layer, wherein the second portion of the third dielectric layer comprising silicon oxynitride with the smaller index of refraction n is further from the IR reflecting layer than is the first portion of the third dielectric layer.

14. A coated article including a coating supported by a glass substrate, the coating comprising:
   a metallic infrared (IR) reflecting layer comprising silver sandwiched between first and second contact layers each of which contacts the IR reflecting layer;
   a first dielectric layer comprising silicon nitride provided between the IR reflecting layer and the glass substrate;
   a second dielectric layer comprising silicon oxynitride provided over the IR reflecting layer;
   a third dielectric layer comprising silicon oxide provided over the IR reflecting layer; and wherein the second dielectric layer comprising silicon oxynitride is provided between the IR reflecting layer and the third dielectric layer comprising silicon oxide.

15. The coated article of claim 14, wherein the second and third dielectric layers contact one another.

16. The coated article of claim 14, further comprising a dielectric layer comprising silicon nitride located between the IR reflecting layer and the second dielectric layer comprising silicon oxynitride.

17. The coated article of claim 14, wherein the second dielectric layer comprising silicon oxynitride is at least one of oxidation graded and nitrogen graded, so that an index of refraction n of the second dielectric layer comprising silicon oxynitride changes from a first value in a first portion of the second dielectric layer to a smaller second value in a second portion of the second dielectric layer, wherein the second portion of the second dielectric layer comprising silicon oxynitride with the smaller index of refraction n is further from the IR reflecting layer than is the first portion of the second dielectric layer.

* * * * *